(12) United States Patent
Kittrell, Jr.

(10) Patent No.: US 10,357,996 B2
(45) Date of Patent: Jul. 23, 2019

(54) LUG DRIVE SYSTEM FOR THE WHEEL OF A MOTORCYCLE

(71) Applicant: Lyndall P Kittrell, Jr., Orange, CA (US)

(72) Inventor: Lyndall P Kittrell, Jr., Orange, CA (US)

( * ) Notice: Subject to any disclaimer, the term of this patent is extended or adjusted under 35 U.S.C. 154(b) by 123 days.

(21) Appl. No.: 15/621,497

(22) Filed: Jun. 13, 2017

(65) Prior Publication Data

US 2018/0354299 A1    Dec. 13, 2018

(51) Int. Cl.
| | |
|---|---|
| *B60B 27/04* | (2006.01) |
| *B60B 27/00* | (2006.01) |
| *B62D 61/02* | (2006.01) |
| *B62M 11/16* | (2006.01) |
| *F16D 65/12* | (2006.01) |
| *B62L 3/06* | (2006.01) |
| *B62L 1/00* | (2006.01) |

(52) U.S. Cl.
CPC .......... *B60B 27/04* (2013.01); *B60B 27/0052* (2013.01); *B62M 11/16* (2013.01); *F16D 65/12* (2013.01); *B60W 2300/36* (2013.01); *B62D 61/02* (2013.01); *B62L 1/005* (2013.01); *B62L 3/06* (2013.01)

(58) Field of Classification Search
CPC . B60B 27/04; B60B 27/0052; B60B 27/0047; B62M 11/16; F16D 65/12; F16H 55/30
USPC ........................................................ 301/6.9
See application file for complete search history.

(56) References Cited

U.S. PATENT DOCUMENTS

| | | | |
|---|---|---|---|
| 3,747,720 A | 7/1973 | Jensen | |
| 6,315,071 B1 | 11/2001 | Gogo | |
| 6,318,810 B1 | 11/2001 | Miyake et al. | |
| 6,371,252 B1 | 4/2002 | Kanehisa | |
| 6,736,464 B1* | 5/2004 | Pidoux | B60B 1/00 188/26 |
| 8,574,108 B2* | 11/2013 | Wang | F16H 55/30 474/152 |
| 9,033,835 B2* | 5/2015 | Blank | B62M 9/10 474/152 |
| 9,334,910 B2* | 5/2016 | Watarai | B60B 27/0052 |
| 2005/0082125 A1* | 4/2005 | Gehrs | F16D 65/12 188/218 XL |
| 2006/0238019 A1* | 10/2006 | Yu | B60B 27/0052 301/105.1 |

(Continued)

*Primary Examiner* — Kip T Kotter
(74) *Attorney, Agent, or Firm* — Morland C. Fischer

(57) ABSTRACT

A lug drive system for a wheel such as that found on a motorcycle. The lug drive system includes a 2-piece lug drive hub assembly mourned on one side of the wheel to apply a driving force thereto. The lug drive hub assembly includes a lug drive sprocket and a hub that are detachably connected together by an inner retaining ring. The lug drive sprocket includes an outer drive ring and an inner carrier disk that are detachably connected together by an outer retaining ring. The lug drive system also includes a 2-piece lug drive rotor assembly mounted on the opposite side of the wheel to apply a braking force thereto. The lug drive rotor assembly includes a lug brake rotor and a hub that are detachably connected together by an inner retaining ring. The lug brake rotor includes an outer friction ring and an inner carrier disk that are detachably connected together by an outer retaining ring.

27 Claims, 10 Drawing Sheets

(56) References Cited

U.S. PATENT DOCUMENTS

| | | | |
|---|---|---|---|
| 2007/0270260 A1* | 11/2007 | Latham | F16H 55/30 |
| | | | 474/152 |
| 2013/0162011 A1* | 6/2013 | Ruopp | B60T 11/16 |
| | | | 303/9.64 |
| 2018/0333986 A1* | 11/2018 | Yuasa | B60B 27/04 |

* cited by examiner

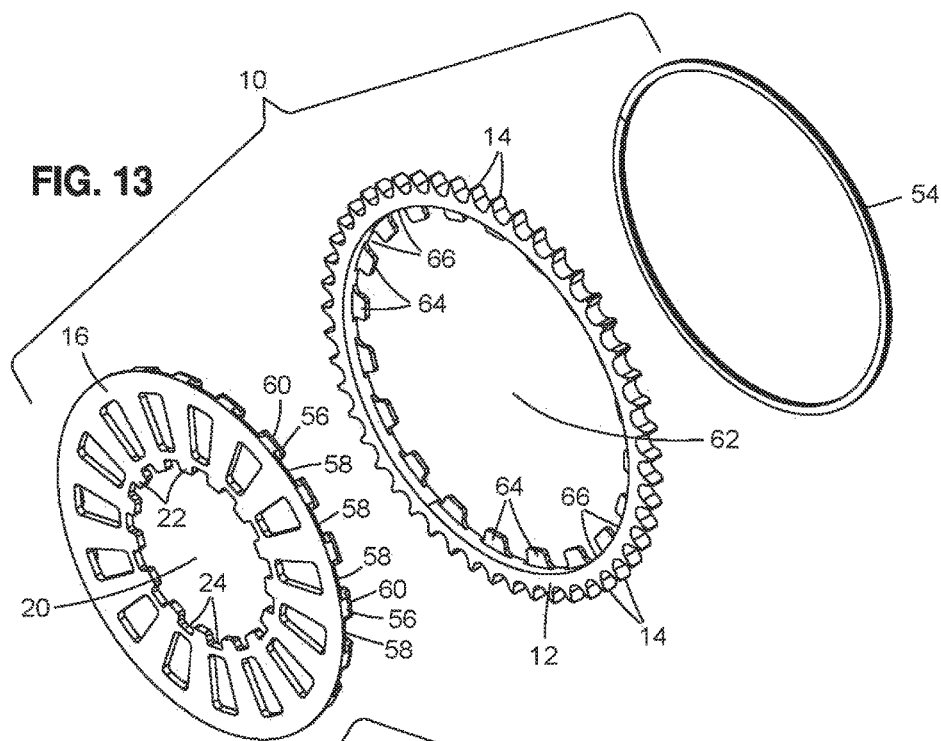
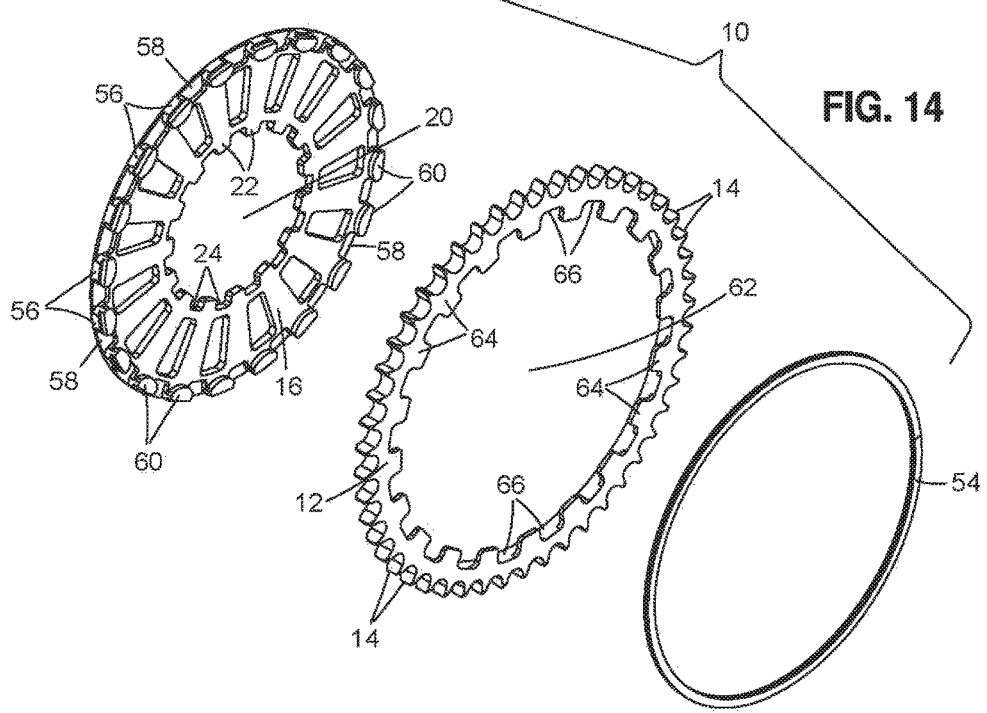

LUG DRIVE SYSTEM FOR THE WHEEL OF A MOTORCYCLE

BACKGROUND OF THE INVENTION

1. Field of the Invention

This invention relates to a lug drive system for a wheel such as that found on a motorcycle. The lug drive system includes a 2-piece lug drive hub assembly mounted on the drive side of the wheel and a 2-piece lug drive rotor assembly mounted on the opposite brake side of the wheel, wherein the two pieces of each of the lug drive hub and lug drive rotor assemblies are detachably connected together without the use of bolts or similar fasteners.

2. Background Art

Wheels that are common to a motorcycle are known to have a lug drive hub assembly that is mounted on the drive side of the wheel and a lug drive rotor assembly that is mounted on the brake side of the wheel. The lug drive hub assembly includes a lug drive sprocket having a set of teeth around which a chain is wound to impart a rotational force to the sprocket that results in a corresponding rotation of the motorcycle wheel. The lug drive rotor assembly includes a lug brake rotor to which brake disk pads are attached to be used for applying a braking pressure against the wheel.

The conventional sprocket and the conventional rotor brake assembly of a motorcycle consists of a pair of pieces that are connected to the wheel by means of a plurality of (e.g., five) bolts that are heavy and add weight to the wheel. Should either of the sprocket or the rotor brake assembly require disassembly for the purposes of maintenance or replacement, all of the bolts must first be removed and then later reinstalled. Having to remove and reinstall a number of bolts to make the repairs has been known to strip the bolt heads due to overtightening. Even making routine repairs requires tools and the expenditure of time to remove and reinstall the bolts which adds to the inconvenience and the maintenance costs and may also damage the motorcycle wheel.

Accordingly, it would be desirable to be able to assemble a 2-piece lug drive hub assembly and a 2-piece lug drive rotor assembly to complete a lug drive system for a wheel (e.g., of a motorcycle) without having to use heavy and time consuming bolts or similar fasteners.

SUMMARY OF THE INVENTION

In general terms, a lug drive system is disclosed having particular application to be connected to the wheel of a motorcycle. The lug drive system includes a 2-piece lug drive hub assembly that is mounted on the drive side of the wheel and a 2-piece lug drive rotor assembly that is mounted on the opposite brake side of the wheel. The lug drive hub assembly includes a hub that is bolted to the drive side of the wheel and a lug drive sprocket that is surrounded by a drive chain that is rotated to apply a rotational driving force to the wheel. The lug drive rotor assembly includes an identical hub that is bolted to the brake side of the wheel and a lug brake rotor to which brake pads are coupled to apply a braking force to the wheel. The respective hubs of the lug drive hub assembly and the lug drive rotor assembly that are mounted at opposite sides of the wheel are axially aligned with one another by way of a coupling hole formed through the wheel so that a wheel axle may extend therebetween.

The lug drive sprocket of the lug drive hub assembly of the lug drive system includes an inner carrier disk that is surrounded by an outer drive ring. The outer drive ring has a series of teeth extending around the periphery thereof to which the drive chain is coupled. A plurality of lugs which project from the inner carrier disk are received through a corresponding plurality of lug cavities that are formed around a disk receiving opening through the center of the outer drive ring. A flexible outer retaining ring is captured by the plurality of lugs which project from the inner carrier disk so that the inner carrier disk is detachably connected to outer drive ring without the use of bolts. The hub of the lug drive hub assembly of the lug drive system includes a clamp at one end thereof that is bolted to the drive side of the wheel and a flared flange at the opposite end. A plurality of lugs which project from the flared flange of the hub are received through a corresponding plurality of lug cavities that are formed around a flange receiving opening through the center of the inner carrier disk of the lug drive sprocket. A flexible inner retaining ring is captured by the plurality of lugs which project from the flared flange so that the hub of the lug drive hub assembly is detachably connected to the lug drive sprocket without the use of bolts.

The lug brake rotor of the lug drive rotor assembly of the lug drive system includes an inner carrier disk that is surrounded by an outer friction ring. The disk brakes are located at opposite sides of the outer friction ring. A plurality of lugs which project from the inner carrier disk are received through a corresponding plurality of lug cavities that are formed around a disk receiving opening through the center of the outer friction ring. A flexible outer retaining ring is captured by the plurality of lugs which project from the inner carrier disk so that the inner carrier disk is detachably connected to the outer friction ring without the use of bolts. The hub of the lug drive rotor assembly is identical to the hub of the lug drive hub assembly and includes a clamp at one end thereof that is bolted to the brake side of the wheel and a flared flange at the opposite end. A plurality of lugs which project from the flared flange of the hub are received through a corresponding plurality of lug cavities that are formed around a flange receiving opening through the center of the inner carrier disk. A flexible inner retaining ring is captured by the plurality of lugs which project from the flared flange so that the hub of the lug drive rotor assembly is detachably connected to the lug brake rotor without the use of bolts.

BRIEF DESCRIPTION OF THE DRAWINGS

FIG. 13 is an exploded front view of a lug drive sprocket of the 2-part lug drive hub assembly shown in FIGS. 5 and 7;

FIG. 14 is an exploded rear view of the lug drive sprocket of the 2-part lug drive hub assembly shown in FIGS. 5 and 7;

DESCRIPTION OF THE PREFERRED EMBODIMENT

Figure 1:
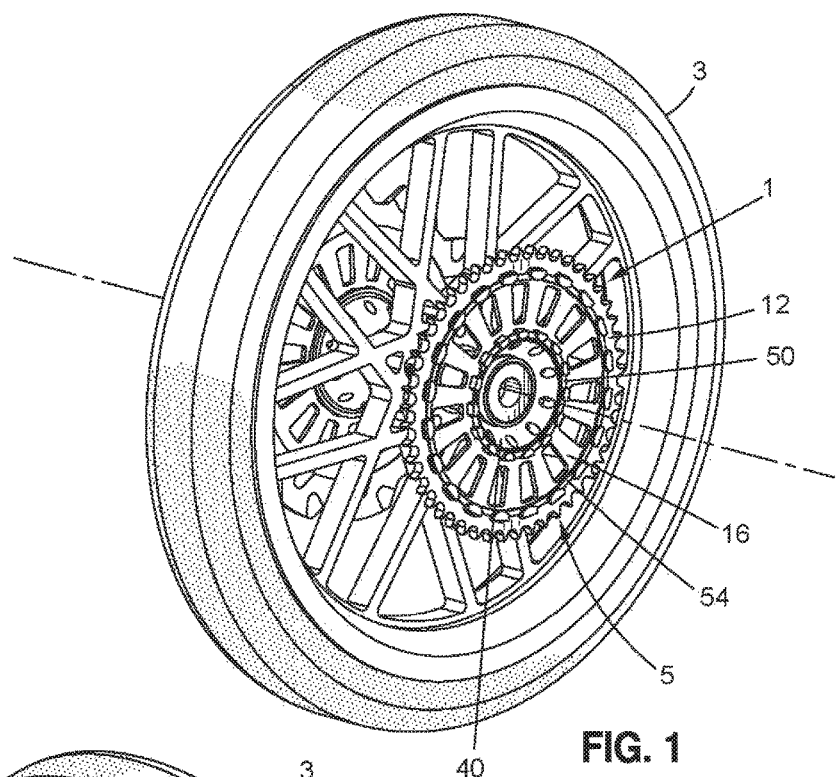
FIG. 1 shows one side of a (e.g., motorcycle) wheel having a 2-piece lug drive hub assembly of a lug drive system connected thereto.
Figure 2:
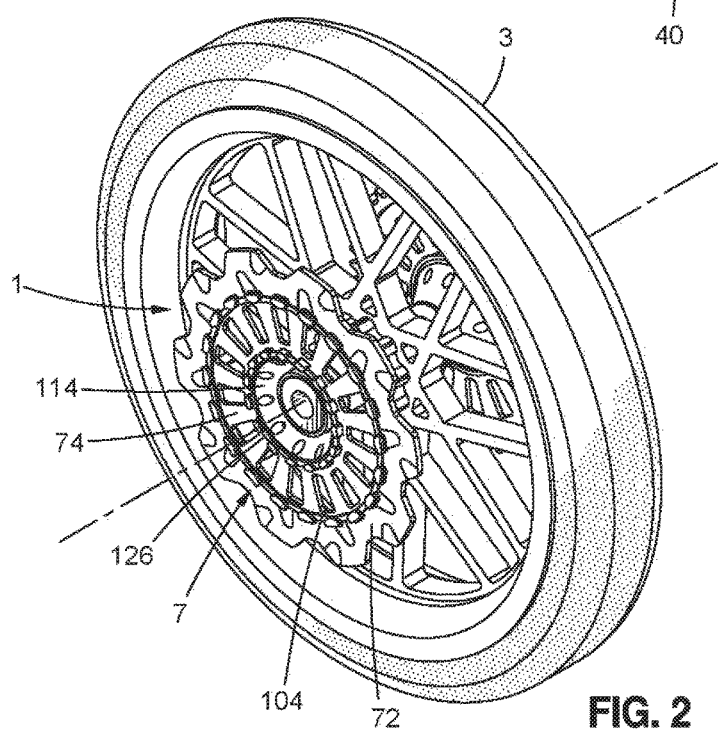
FIG. 2 shows the opposite side of the wheel of FIG. 1 having a 2-piece lug drive rotor assembly of the lug drive system connected thereto.
Figure 3:
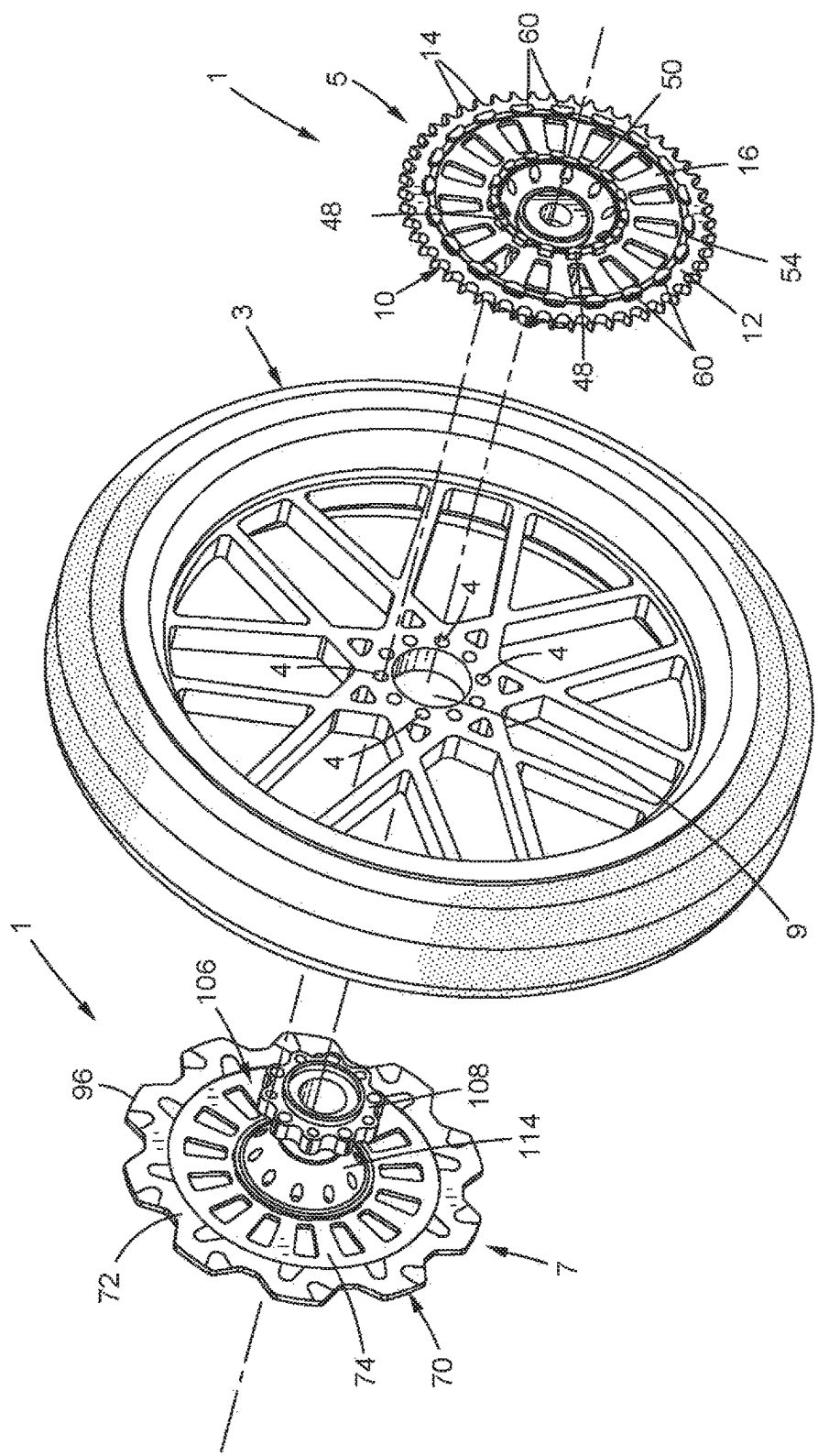
FIG. 3 is an exploded view of the wheel shown in FIGS. 1 and 2 with the lug drive hub assembly and the lug drive rotor assembly detached from opposite sides of the wheel.

Referring initially to FIGS. 1-3 of the drawings, there is shown a preferred embodiment for a lug drive system 1 connected to a billet wheel 3 such as that having particular application for use on a motorcycle (not shown). The lug drive system 1 includes a 2-piece lug drive hub assembly 5 mounted at a drive side of the wheel 3 and a 2-piece lug drive rotor assembly 7 mounted at an opposite brake side of wheel 3. The lug drive hub assembly 5 is axially aligned with the lug drive rotor assembly 7 on opposite sides of the wheel 3 via a coupling hole 9 located at the center of the rim on which the tire of wheel 3 is mounted.

As will be understood by those skilled in the art, a drive chain (not shown) of the motorcycle is coupled to the lug drive hub assembly 5, and brake disks of the motorcycle are carried by the lug drive rotor assembly 7. As will be explained in greater detail hereinafter, each of the 2-piece lug drive hub and the lug drive rotor assemblies 5 and 7 are assembled to complete the lug drive system 1 for the wheel 3 without the use of relatively heavy bolts. Moreover, by virtue of the improvements offered by the lug drive system 1 herein disclosed, the individual pieces of each of the 2-piece lug drive hub and lug drive rotor assemblies 5 and 7 may be quickly and easily separated from one another to be repaired and/or replaced one at a time and without having to otherwise replace the complete assembly as a whole. Likewise, the absence of bolts minimizes the weight of the wheel and avoids possible damage to the wheel as a consequence of having to use the tools that are required to remove and install the bolts.

Details of the 2-piece lug drive hub assembly 5 of the lug drive system 1 that is located at the drive side of the wheel 3 are now explained while referring to FIGS. 3-7 of the drawings. The first piece of the 2-piece lug drive hub assembly 5 is a lug drive sprocket 10. An outer drive ring 12 runs around the periphery of the lug drive sprocket 10. A plurality of circumferentially extending drive teeth 14 are formed side-by-side one another so as to project radially outward from the drive ring 12. As previously indicated, a drive chain (not shown) is mated in surrounding engagement to the drive ring 12 of the lug drive hub assembly 5 at the drive teeth 14 thereof by which to apply a rotational driving force to the lug drive system 1 and to the wheel 3.

The outer drive ring 12 of the lug drive sprocket 10 surrounds an inner carrier disk 16 (best shown in FIGS. 13 and 14). A series of weight reducing openings 18 are evenly spaced from one another around the carrier disk 16 to minimize the weight of the lug drive sprocket 10. Extending through the center of the carrier disk 16 of the lug drive sprocket 10 is a round flange receiving opening 20. A plurality of alternating inwardly extending lugs 22 and outwardly extending lug cavities 24 are formed in the carrier disk 16 around the flange receiving opening 20. That is, lugs 22 project radially inward from the carrier disk 16 into the flange receiving opening 20 located at the center of the carrier disk. Alternating lug cavities 24 are recessed relative to the adjacent inwardly extending lugs 22 so that cavities extend radially outward within the carrier disk 16.

The second piece of the 2-piece lug drive hub assembly 5 is a hub 28 to be coupled to the lug drive sprocket 10 at the flange receiving opening 20 at the center of the carrier disk 16. Located at one end of the hub 28 is a clamp 30 having ridges 34 extending around the periphery thereof. A set of threaded bolt holes 36 is formed through alternating ones of the ridges 34 of clamp 30. The hub 28 of the lug drive hub assembly 5 is attached to the drive side of the wheel 3 FIGS. 1-3 by means of bolts (not shown) that are received within respective threaded bolt holes 36 formed through the clamp 30 of the hub 28.

Located at the opposite end of the hub 28 of the lug drive hub assembly 5 is a flared (i.e., shirt-shaped) flange 40. The flange 40 is spaced from the clamp 30 by a cylindrical neck 38 that extends therebetween. A set of tool access openings 42 are spaced from one another around the flared flange 40. The tool access openings 42 through the flange 40 are axially aligned with the threaded bolt holes 36 through the clamp 30 so that a tool (not shown) can be inserted through the access openings 42 to apply a rotational force to the threaded bolts that are located in the bolt holes 36 by which to connect the hub 28 to the drive side of the wheel at bolt holes (designated 4 in FIG. 3) in the wheel 3. A plurality of alternating outwardly extending lugs 44 and inwardly extending lug cavities 46 are formed in the flared flange 40 around the outside peripheral edge thereof. The lugs 44 project outwardly from the flared flange 40 towards the lug drive sprocket 10. Alternating lug cavities 46 are recessed relative to the adjacent outwardly extending lugs 44 so that cavities 46 extend inwardly of the flared flange 40.

Figure 5:
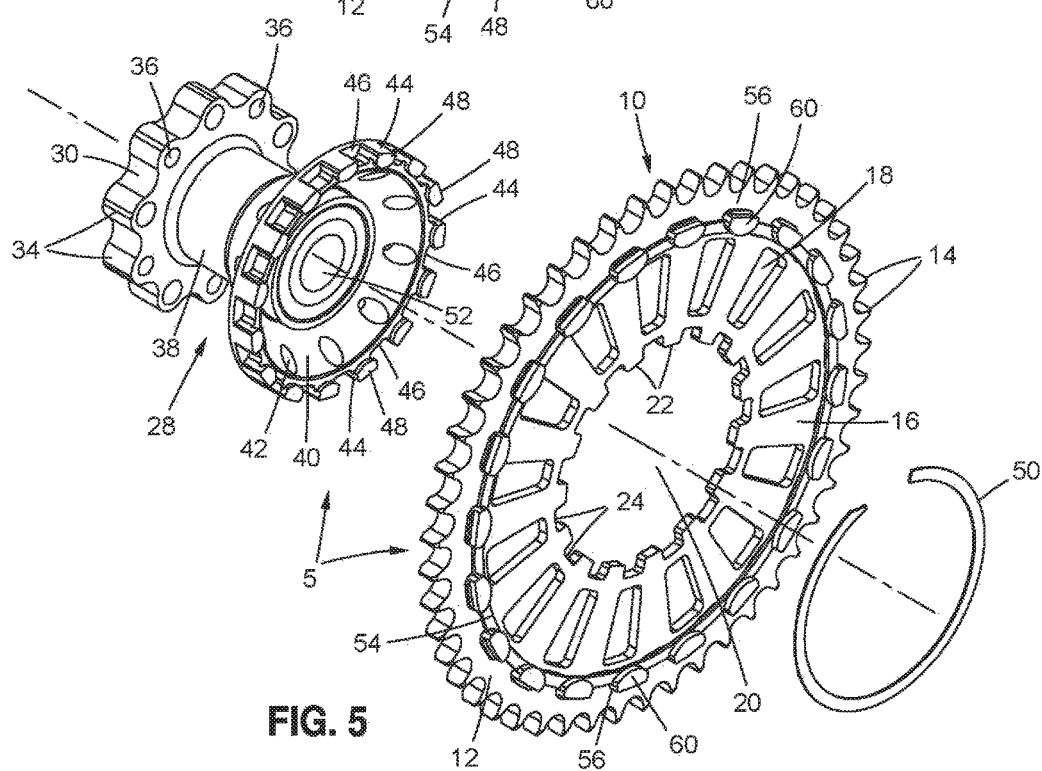
FIG. 5 is an exploded rear view of the 2-part lug drive hub assembly shown in FIG. 4 prior to assembly.
Figure 6:
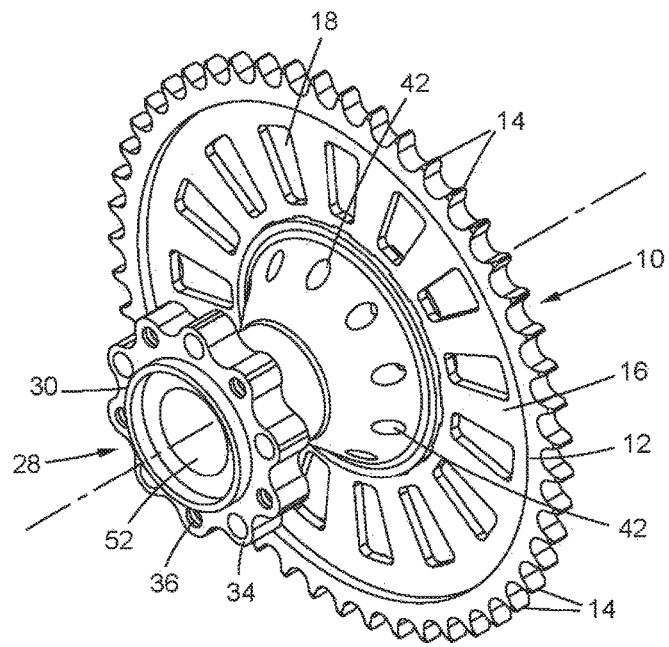
FIG. 6 is a front perspective view of the 2-part lug drive hub assembly after assembly.

As is best shown in FIG. 5, each of the outwardly extending lugs 44 of the flared flange 40 of the hub 28 has a perpendicular ring engaging tip 48 located at the outermost end thereof. The perpendicular ring engaging tips 48 of the lugs 44 turn radially inward relative to the outside peripheral edge of the flared flange 40 of hub 28.

As an important advantage of this invention, the hub 28 is detachably connected to the lug drive sprocket 10 without the use of bolts so as to assemble the 2-part lug drive hub assembly 5 to be coupled to the drive side of the wheel 3 (of FIGS. 1-3). More particularly, the hub 28 is pushed towards the lug drive sprocket 10 so that the lugs 44 which extend outwardly from the flared flange 40 of hub 28 are received through respective ones of the lug cavities 24 that are recessed within the carrier disk 16 of the lug drive sprocket 10. At the same time, the lugs 22 which project radially inward from the carrier disk 16 of the lug drive sprocket 10 are received within respective ones of the lug cavities 46 which are recessed within the flared flange 40 of the hub 28.

Figure 4:
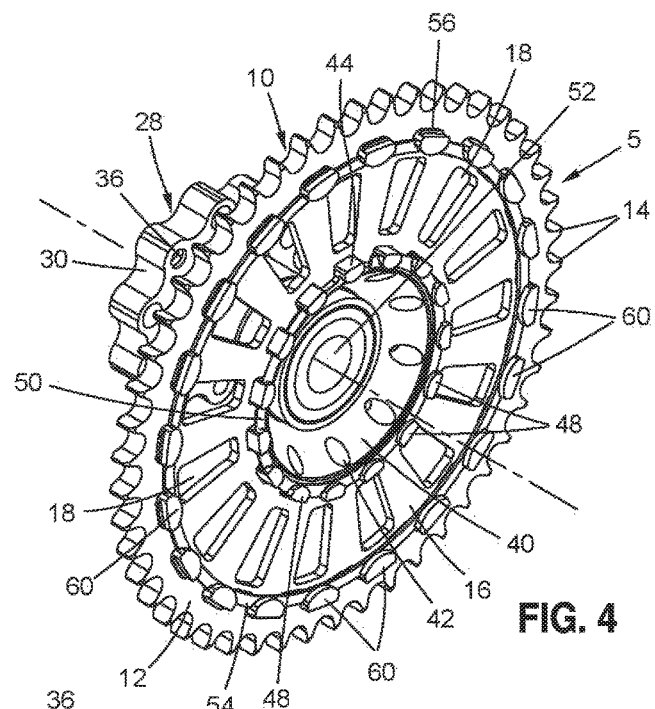
FIG. 4 is a rear perspective view of the 2-part lug drive hub assembly of the lug drive system shown in FIGS. 1-3 after assembly.
Figure 7:
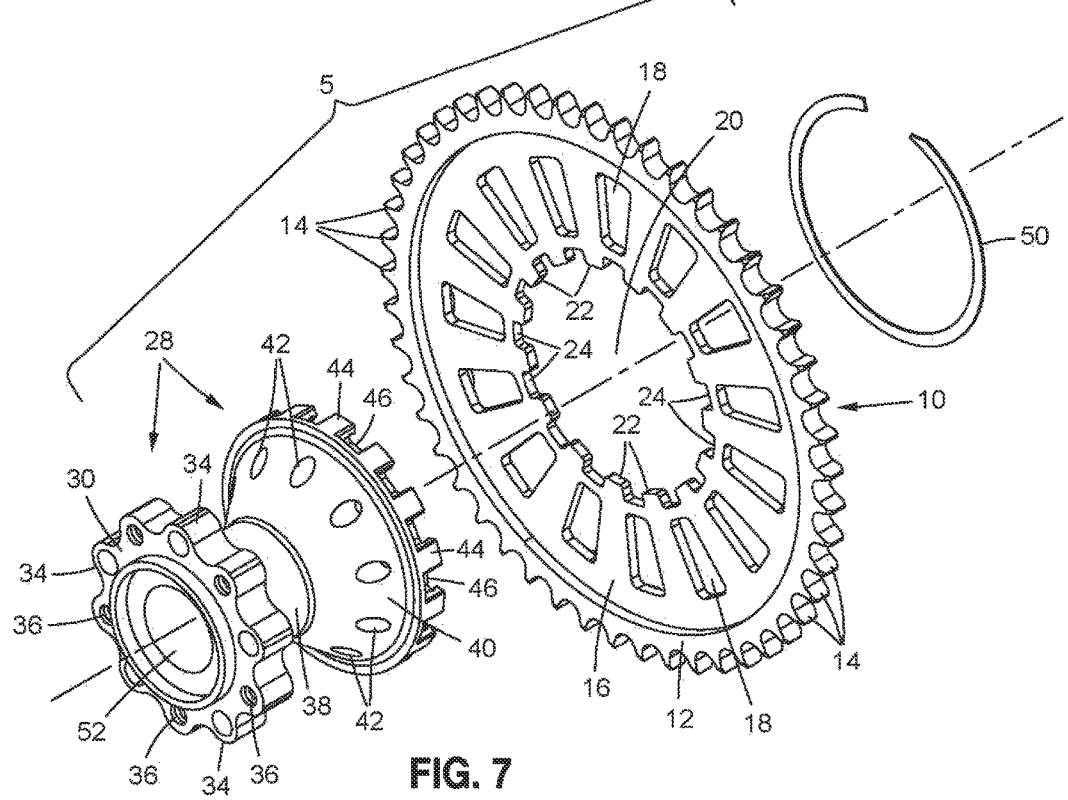
FIG. 7 is an exploded front view of the 2-part lug drive hub assembly prior to assembly.
Figure 8:
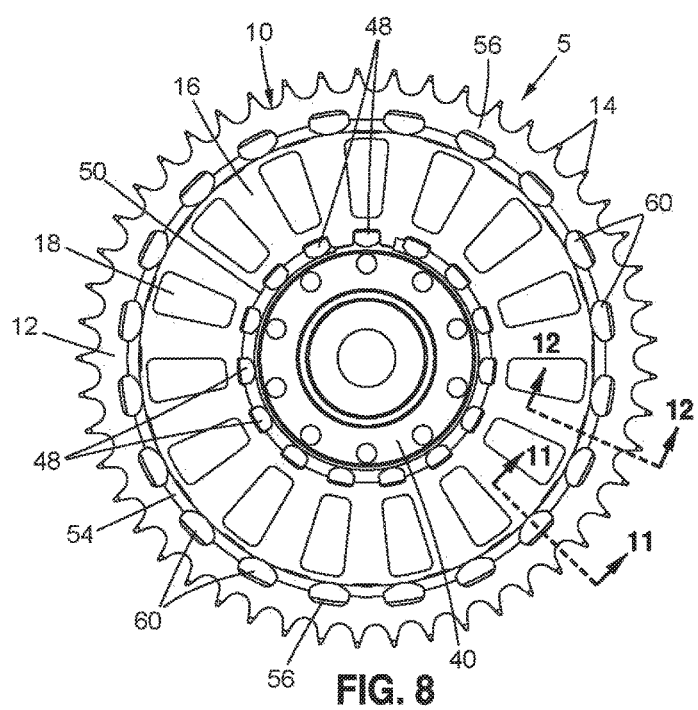
FIG. 8 is a rear elevational view of the lug drive hub assembly.
Figure 9:
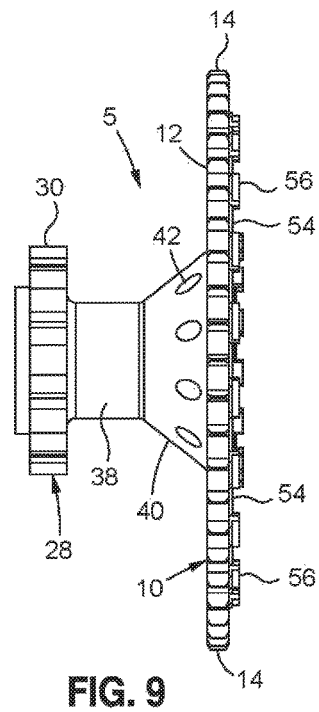
FIG. 9 is a side elevational view of the lug drive hub assembly.
Figure 10:
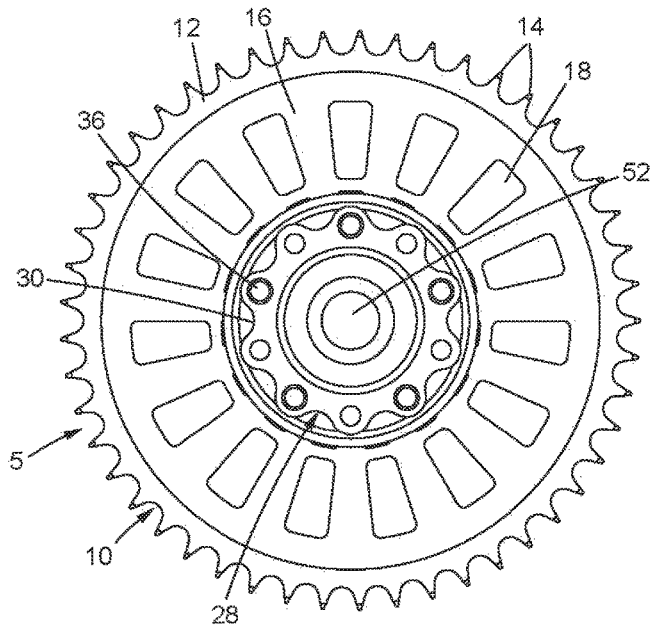
FIG. 10 is a front elevational view of the lug drive hub assembly.

The detachable connection of the hub 28 to the lug drive sprocket 10 is maintained (without the use of bolts) by means of a flexible, split inner retaining ring 50 (best shown in FIGS. 5 and 7). The inner retaining ring 50 is preferably manufactured from spring (e.g., 304 stainless) steel so as to have a spring-like memory. As is best shown in FIGS. 4 and 5, the hub 28 is coupled to the carrier disk 16 so that a wheel axle receiving passage 52 which runs through the hub 28 is axially aligned with the flange receiving opening 20 through the center of the carrier disk 16. In this case, the lugs 44 which extend outwardly from the hub 28 for receipt through respective ones of the lug cavities 24 of the lug drive sprocket 10 are moved into and through the flange receiving opening 20 of the carrier disk 16.

The flexible inner retaining ring 50 is then simply bent (i.e., deformed) into surrounding engagement with the flared flange 40 of the hub 28. That is, the inner retaining ring 50 is snapped into removable receipt below the ring engaging tips 48 of the lugs 44 of the flared flange 40 which are moved through the flange receiving opening 20 formed in the carrier disk 16. At the same time, the inner retaining ring 50 lies flush against the lugs 22 which project radially inward from the carrier disk 16 into the flange receiving opening 20 at the center of the disk 16. The receipt of the inner retaining ring 50 located below the ring engaging tips 48 of the lugs 44 of hub 28 and lying against the lugs 22 of carrier disk 16 so as to extend in surrounding engagement with the flared flange 40 prevents the hub 28 from being detached from the lug drive sprocket 10.

It is important to recognize that the foregoing connection of the hub 28 to the lug drive sprocket 10 to complete the lug drive hub assembly 5 is accomplished without the use of bolts or similar fasteners. Should it be necessary to separate the hub 28 from the lug drive sprocket 10 for the purposes of repair or replacement of one and/or the other piece, the flexible inner retaining ring 50 is once again bent (i.e., deformed) so as to be quickly and easily pulled out of its removable receipt below the ring engaging tips 48 of the lugs 44 of the flared flange 40 without having to waste time removing a plurality of bolts as might otherwise be required with some conventional lug drive hub assemblies.

FIGS. 8-13 of the drawings illustrate a flexible, split outer retaining ring 54 used as a substitute for bolts to detachably connect the outer drive ring 12 in surrounding engagement with the inner carrier disk 16 to assemble the lug drive sprocket 10 of the lug drive hub assembly 5. FIGS. 13 and 14 show the outer drive ring 12 and the inner carrier disk 16 prior to their being detachably connected to one another by means of the outer retaining ring 54. Like the earlier described inner retaining ring 50, the outer retaining ring 54 is preferably manufactured from spring steel so as to have spring-like memory.

As is best shown in FIGS. 13 and 14, a plurality of upstanding lugs 56 are spaced from one another around the circumference of the inner carrier disk 16 of lug drive sprocket 10. A corresponding plurality of lug receiving gaps 58 alternate with the lugs 56 around the circumference of the carrier disk 16. Each of the upstanding lugs 56 has a perpendicular ring engaging tip 60 located at the outermost end thereof. The perpendicular ring engaging tips 60 turn radially inwardly towards the round flange receiving opening 20 formed through the center of the carrier disk 16.

The outer drive ring 12 to be detachably connected to the inner carrier disk 16 to complete the lug drive sprocket 10 has a disk receiving opening 62 located at the center thereof. The opening 62 is sized for the receipt therewithin of the carrier disk 16. Pluralities of alternating radially inward extending lugs 64 and radially outward extending lug cavities 66 are formed in the drive ring 12 around the disk receiving opening 62. That is, the lugs 64 project from the drive ring 12 so as to extend into the disk receiving opening 62 located at the center of the drive ring. The lug cavities 66 which alternate with the lugs 64 are recessed within the drive ring 12.

The inner carrier disk 16 of the lug drive sprocket 10 is moved within the disk receiving opening 62 at the center of the outer drive ring 12 so as to be coaxially aligned therewith. The upstanding lugs 56 from the carrier disk 16 are correspondingly moved through respective ones of the lug cavities 66 which surround the disk receiving opening 62 of drive ring 12. Accordingly, the lugs 56 that are located around and stand upwardly from the carrier disk 16 alternate with the radially inward extending lugs 64 that are located around the disk receiving openings 62 of the drive ring 12. Likewise, the radially inward extending ring engaging tips 60 from the upstanding lugs 56 of the carrier disk 16 are now pushed into and through the disk receiving opening 62 at the center of the drive ring 12 within which the carrier disk 16 has been moved (best shown in FIGS. 5 and 7).

The inner carrier disk 16 and the outer drive ring 12 are detachably connected to one another to assemble the lug drive sprocket 10 of the lug drive hub assembly 5 by means of the flexible outer retaining ring 54. That is, the retaining ring 54, which may have either a helical or an annular shape, is simply bent (i.e., deformed) into surrounding engagement with the carrier disk 16 and snapped into removable receipt below the ring engaging tips 60 of the lugs 56 which stand upwardly from the carrier disk 16 and project through the disk receiving opening 62 formed in drive ring 12 (best shown in FIGS. 11 and 12). At the same time, the outer retaining ring 54 lies flush against the lugs 64 which project from the drive ring 12 into the disk receiving opening 62 at the center of ring 12.

Figures 11, 12:
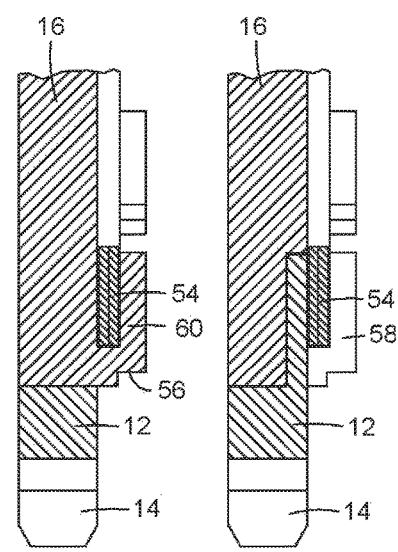
FIG. 11 is a cross-section of the lug drive hub assembly taken along lines 11-11 of FIG. 8.
FIG. 12 is a cross-section of the lug drive hub assembly taken along lines 12-12 of FIG. 8.

In the example of FIGS. 11 and 12, the outer retaining ring 54 is shown being of sufficient length to extend twice around the carrier disk 16 fit below the ring engaging tips 60 of the upstanding lugs 56. However, the length of the outer retaining ring 54 and the number of turns thereof around the carrier disk 16 is not to be considered a limitation of this invention. What is important is the ability to detachably connect the inner carrier disk 16 to the outer drive ring 12 to assemble the lug drive sprocket 10 without the use of bolts or similar fasteners.

The location of the outer retaining ring 54 below the ring engaging tips 60 and against the lugs 64 prevents a separation of the carrier disk 16 from the drive ring 12. However, when a disassembly of the lug drive sprocket 10 is necessary for repair or replacement of disk 16 and/or ring 12, the flexible outer retaining ring 54 is once against bent (i.e., deformed) so as to be easily pulled out of its removable receipt below the ring engaging tips 60 of the lugs 56 of the carrier disk 16 without first having to waste time removing a plurality of bolts as may otherwise be required with some conventional lug drive sprocket assemblies.

Details of the 2-piece lug drive rotor assembly 7 of the lug drive system 1 of FIGS. 1-3 that is located at the brake side of the wheel 3 are now explained while referring to FIGS. 17-23 of the drawings. The 2-piece lug drive rotor assembly 7 includes a lug brake rotor 70 that is detachably connected to a hub 106 without the use of bolts. The lug brake rotor 70 carries the disk pads that apply the braking force to the wheel 3.

Figure 15:
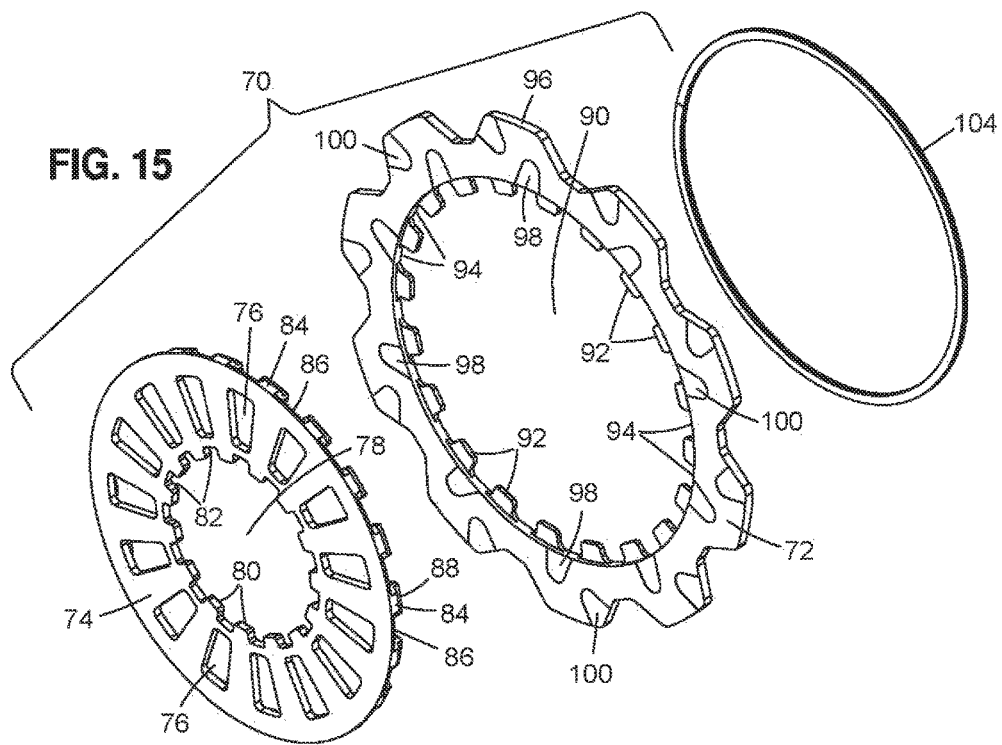
FIG. 15 is an exploded front view of a lug brake rotor of the 2-part lug drive rotor assembly for the lug drive system shown in FIGS. 2 and 3.
Figure 16:
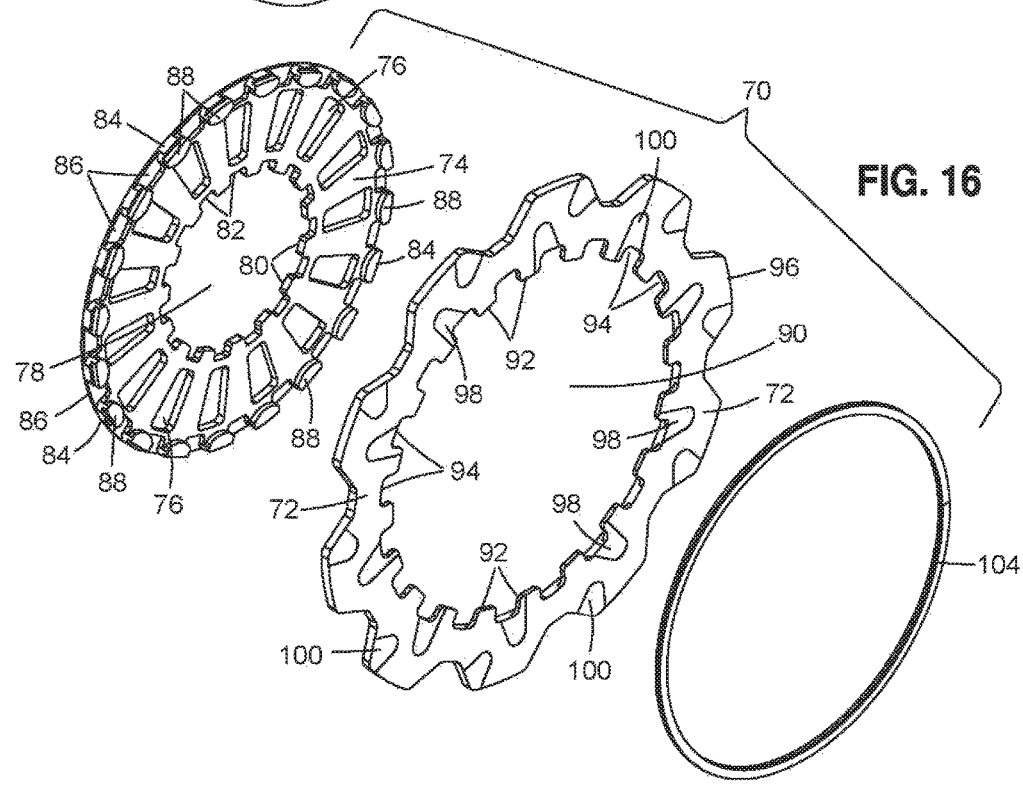
FIG. 16 is an exploded rear view of the lug brake rotor of the 2-part lug drive rotor assembly for the lug drive system shown in FIGS. 2 and 4.
Figure 17:
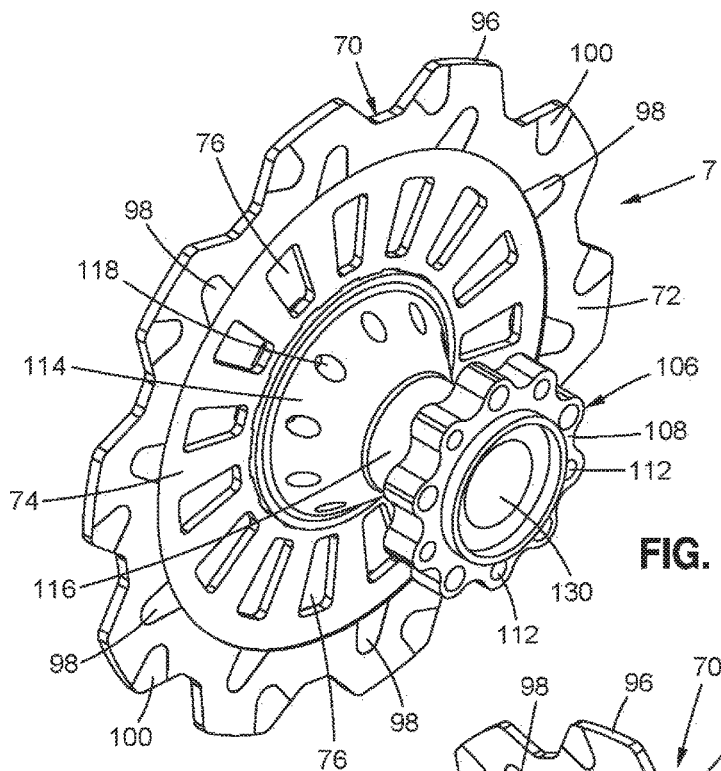
FIG. 17 is a front perspective view of the 2-part lug drive rotor assembly after assembly.

The lug brake rotor 70 includes an outer friction ring 72 that surrounds an inner carrier disk 76 (best shown in FIGS. 15 and 16). The inner carrier disk 74 of the lug brake rotor 70 of the lug drive rotor assembly 5 is identical to the inner carrier disk 16 of the lug drive sprocket 10 of the lug drive hub assembly 5 and, therefore, only a brief description of the carrier disk 74 will be provided. A series of weight reducing slots 76 are evenly spaced from one another around the disk 74. Extending through the center of the inner carrier disk 74 of the lug brake rotor 70 is a round flange receiving opening 78. Pluralities of alternating radially inward extending lugs 80 and radially outward extending lug cavities 82 are formed in the carrier disk 74 around the flange receiving opening 78 thereof. The radially inward extending lugs 80 extend into the flange receiving opening 78, and the alternating radially outward extending lug cavities 82 are recessed within the carrier disk 74 relative to the lugs 80.

A plurality of upstanding lugs 84 are spaced from one another around the circumference of the carrier disk 74 of the lug brake rotor 70. A corresponding plurality of lug receiving gaps 86 alternate with the lugs 84 around the circumference of the carrier disk 74. Each of the upstanding lugs 84 has a perpendicular ring engaging tip 88 located at the outermost end thereof. The perpendicular ring engaging tips 88 turn radially inward towards the round flange receiving opening 78 formed through the center of the carrier disk 74.

The outer friction ring 72 to be detachably connected to the inner carrier disk 74 to complete the lug brake rotor 70 has a disk receiving opening 90 located at the center thereof so as to receive the carrier disk 74 therewithin. Pluralities of alternating radially inward extending lugs 92 and radially outward extending lug cavities 94 are formed in the friction ring 72 around the disk receiving opening 90. The radially inward extending lugs 92 extend into the disk receiving opening 90, and the alternating radially outward extending lug cavities 94 are recessed within the friction ring 72 relative to the lugs 92.

A scalloped edge 96 surrounds the circumference of the outer friction ring 72 to dissipate heat and facilitate the cooling of the friction ring when the brake pads which are carried by the lug brake rotor 70 are used to apply a braking force to the wheel 3. Each of the opposite sides of the friction ring 72 has a set of inside gas slots 98 that are recessed within and spaced from one another around the disk receiving opening 90 of friction ring 72 and a set of outside gas slots 100 that are recessed within and spaced from one another around the scalloped edge 96 of friction ring 72. The sets of recessed inside and outside gas slots 98 and 100 formed in the friction ring 72 permit gas that is produced from friction generated by the brake pads to escape to the atmosphere during braking of the motorcycle.

To complete the assembly of the lug brake rotor 70 of the lug drive rotor assembly 7 of the lug drive system 1 shown in FIGS. 1-3, the inner carrier disk 74 is moved within the disk receiving opening 90 at the center of the outer friction ring 72 so as to be coaxially aligned therewith. The upstanding lugs 84 from the carrier disk 74 are correspondingly moved through respective ones of the lug cavities 94 which surround the disk receiving opening 90 of friction ring 72. Accordingly, the lugs 84 that are located around and stand upwardly from the carrier disk 74 alternate with the radially inward extending lugs 92 that are located around the disk receiving opening 90 at the center of the friction ring 72. Likewise, the radially inward extending ring engaging tips 88 of the upstanding lugs 84 of the carrier disk 76 are now pushed through the disk receiving opening 90 of the friction ring 72 within which the carrier disk 72 is moved (best shown in FIGS. 18 and 19).

The inner carrier disk 74 and the outer friction ring 72 are detachably connected to one another to assemble the lug brake rotor 70 by means of a flexible outer retaining ring 104 which may be identical to the outer retaining ring 54 that was previously described while referring to FIGS. 7-12. Therefore, the retaining ring 104 is bent (i.e., deformed) to fit into surrounding engagement with the carrier disk 74 and snapped into removable receipt below the ring engaging tips 88 of the lugs 84 which stand upwardly from the carrier disk 74 and project through the disk receiving opening 90 formed in the friction ring 72 (best shown in FIGS. 19-22). At the same time, the outer retaining ring 104 lies flush against the lugs 92 which extend from the outer friction ring 72 toward the disk receiving opening 90 at the center thereof.

The length of the outer retaining ring 104 can be selected for it to make one or two (or more) turns around the inner carrier disk 74. What is important is to recognize the advantage of using the outer retaining ring 104 to detachably connect the inner carrier disk 74 to the outer friction ring 72 to complete the lug brake rotor 70 of the lug drive rotor assembly 7 without the use of bolts or similar fasteners.

The location of the outer retaining ring 104 below the ring engaging tips 88 and against the lugs 92 prevents a separation of the carrier disk 74 from the friction ring 72. However, when a disassembly of the lug brake rotor 70 is necessary for repair or replacement of disk 74 and/or ring 72, the flexible outer retaining ring 104 is once again bent (i.e., deformed) so as to be easily pulled out of its removable receipt below the ring engaging tips 88 of the lugs 84 of the carrier disk 74 without first having to waste time removing a plurality of bolts as would otherwise be required with some conventional lug drive sprocket assemblies.

As is best shown in FIGS. 17-22, a hub 106 is detachably connected to the lug brake rotor 70 to assemble the 2-piece lug drive rotor assembly 7 to be connected to the brake side of the wheel 3 shown in FIGS. 1-3. The hub 106 may be identical to the previously described hub (designated 28 in FIGS. 5-7) from the lug drive hub assembly 5. Therefore, only a brief description of the hub 106 from the rotor assembly 7 will be provided.

The hub 106 is coupled to the lug drive rotor 70 at the flange receiving opening 78 at the center of the carrier disk 74. Located at one end of the hub 106 is a clamp 108 having ridges 110 extending around the periphery thereof. A set of threaded bolt holes 112 is formed through alternating ridges 110 of clamp 108. Located at the opposite end of the hub 106 is a flared (i.e., skirt-shaped) flange 114. The flange 114 is spaced from the clamp 108 by a cylindrical neck 116 that extends therebetween. Tool access openings 118 are spaced from one another around the flared flange 114. The tool access openings 118 through the flared flange 114 are axially aligned with the threaded bolt holes 112 through the clamp 108 so that a tool (not shown) can be inserted through the access openings 118 to apply a force to the bolts that are located in the bolt holes 112 so as to rotate the bolts into the wheel 3 of FIGS. 1-3 by which the lug drive rotor assembly 7 is connected to the brake side of wheel 3.

Figure 19:
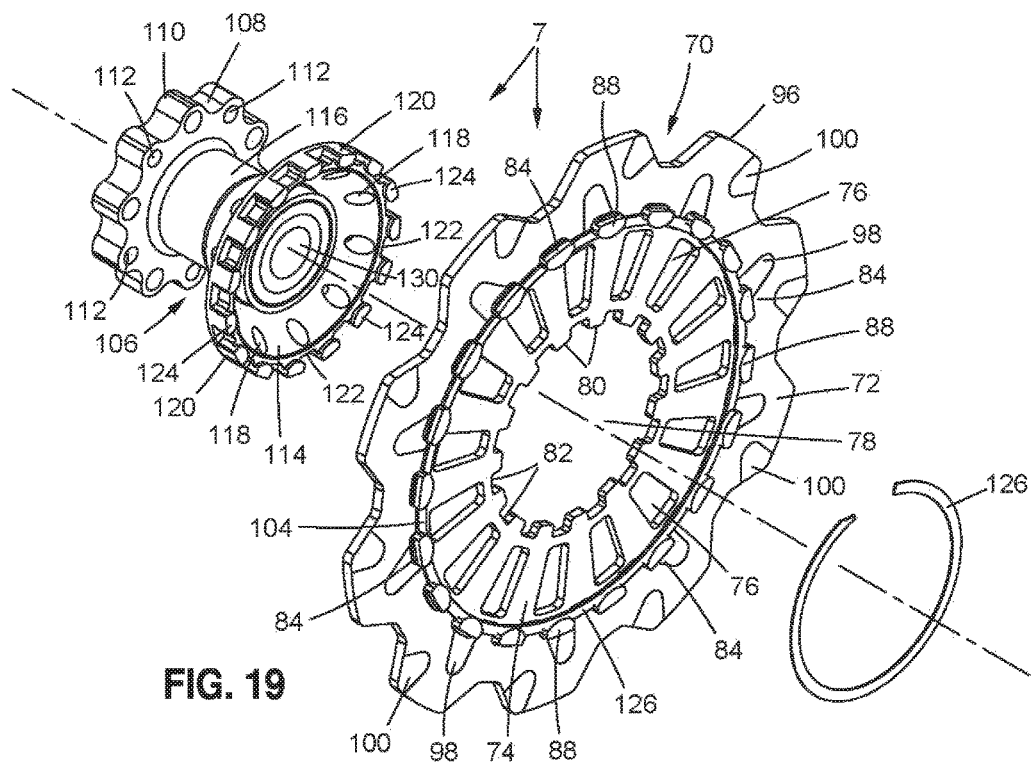
FIG. 19 is an exploded rear view of the lug 2-part drive rotor assembly shown in FIG. 17 prior to assembly.
Figure 20:
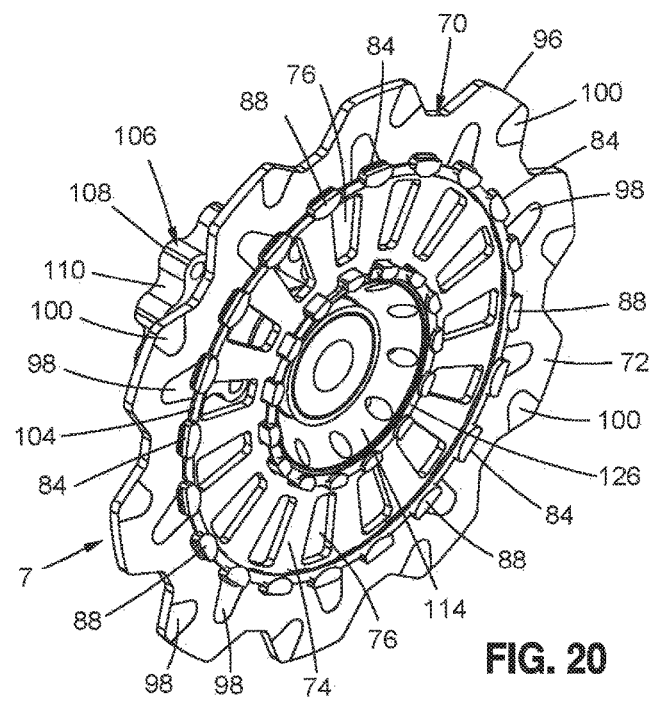
FIG. 20 is a rear perspective view of the lug drive rotor assembly shown in FIGS. 18 and 19 after assembly.
Figure 21:
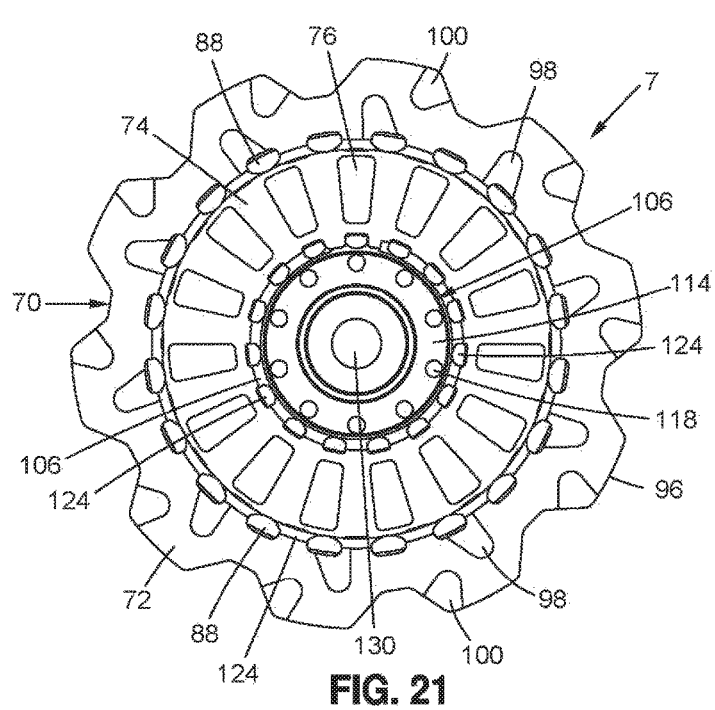
FIG. 21 is a rear elevational view of the lug drive rotor assembly.
Figure 22:
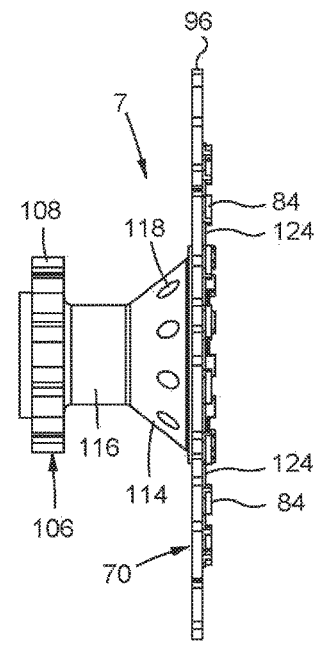
FIG. 22 is a side elevational view of the lug drive rotor assembly.
Figure 23:
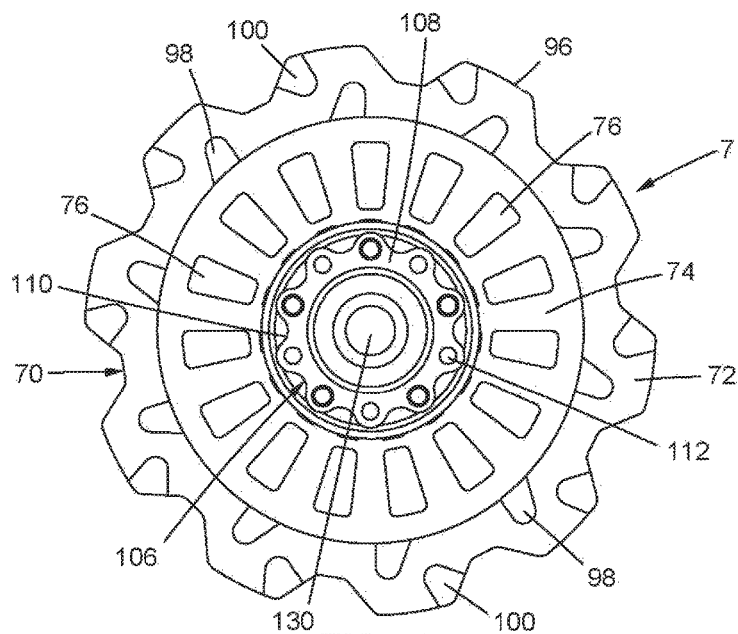
FIG. 23 is a front elevational view of the lug drive rotor assembly.

A plurality of alternating outwardly extending lugs 120 and inwardly extending lug cavities 122 are formed in flared flange 114 around the outside peripheral edge thereof. The lugs 120 project outwardly from the flared flange 114 towards the lug brake rotor 70. Alternating lug cavities 122 are recessed relative to the adjacent outwardly extending lugs 120 so that the cavities 122 extend inwardly of the flared flange 114. As is best shown in FIG. 19, each of the outwardly extending lugs 120 of the flared flange 114 of the hub 106 has a perpendicular ring engaging tip 124 located at the outermost end thereof. The perpendicular ring engaging tips 124 of the lugs 120 turn radially inward relative to the outside peripheral edge of the flared flange 114 of hub 106.

As another important advantage of this invention, the hub 106 is detachably connected to the lug brake rotor 70 without the use of bolts so as to assemble the 2-piece lug drive rotor assembly 7 to be attached to the brake side of the wheel 3 (of FIGS. 1-3). More particularly, the hub 106 is pushed towards the lug brake rotor 70 so that the lugs 120 which extend outwardly from the flared flange 114 of hub 106 are received through respective ones of the lug cavities 82 that are recessed within the carrier disk 74 of the lug brake rotor 70. At the same time, the lugs 80 which project radially inward from the carrier disk 74 of the lug drive rotor 70 are received within respective ones of the lug cavities 122 which are recessed within the flared flange 114 of the hub 106.

Figure 18:
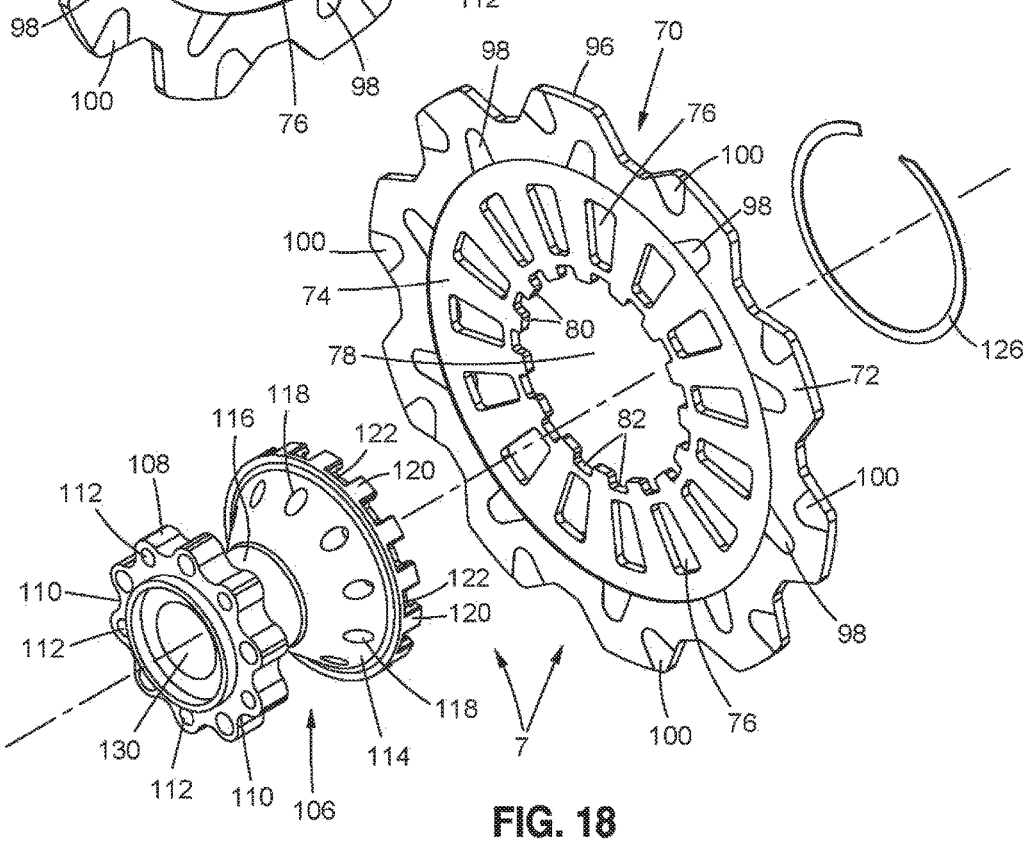
FIG. 18 is an exploded front view of the 2-part lug drive rotor assembly shown in FIG. 17 prior to assembly.

The detachable connection of the hub 106 to the lug brake rotor 70 is maintained (without the use of bolts) by means of a flexible split inner retaining ring 126 (best shown in FIGS. 18 and 19). The inner retaining ring 126 may be identical to the inner retaining ring 50 shown in FIGS. 5 and 7. As is best shown in FIGS. 18 and 19, the hub 106 is coupled to the carrier disk 74 so that a wheel axle receiving passage 130 which runs through the hub 106 is axially aligned with the flange receiving opening 78 through the center of the carrier disk 74. In this case, the lugs 120 which extend outwardly from the hub 106 for receipt through respective ones of the lug cavities 82 of the inner carrier disk 74 of the lug brake rotor 70 are moved into and through the flange receiving opening 78 of the inner carrier disk 74.

The flexible inner retaining ring 126 is then simply bent (i.e., deformed) into surrounding engagement with the flared flange 114 of the hub 106. That is, the inner retaining ring 126 is snapped into removable receipt below the ring engaging tips 124 of the lugs 120 of the flared flange 114 which are moved through the flange receiving opening 78 formed in the carrier disk 74. At the same time, the inner retaining ring 126 lies flush against the lugs 80 which project radially inward from the carrier disk 74 into the flange receiving opening 78 at the center of the disk 74. The receipt of the inner retaining ring 126 located below the ring engaging tips 124 of the lugs 120 of hub 106 and lying against the lugs 80 of carrier disk 74 so as to extend in surrounding engagement with the flared flange 114 prevents the hub 106 from being detached from the lug brake rotor 70.

It is important to recognize that the detachable connection of the hub 106 to the lug brake rotor 70 to complete the 2-piece lug drive rotor assembly 7 is accomplished without the use of bolts or similar fasteners. Should it be necessary to separate the hub 106 from the lug brake rotor 70 for the purposes of repair or replacement, the flexible inner retaining ring 126 is once again bent (i.e., deformed) so as to be quickly and easily pulled out of its removable receipt below the ring engaging tips 124 of the lugs 120 of the flared flange 114 without having to waste time removing a plurality of bolts as might otherwise be required with some conventional lug drive hub assemblies.

The invention claimed is:

1. A combination comprising:
a wheel having first and opposite sides; and
a lug drive system to be connected to the wheel to apply driving and braking forces to the wheel, said lug drive system having a lug drive hub assembly located at the first side of the wheel and a lug drive rotor assembly located at the opposite side of the wheel,
the lug drive hub assembly of said lug drive system including a first hub having first and opposite ends and being connected to the first side of the wheel and a lug drive sprocket to receive said driving force and impart said driving force to the wheel by way of said hub, the first hub and the lug drive sprocket of said lug drive hub assembly being detachably connected to one another without the use of bolts,
wherein the lug drive sprocket of said lug drive hub assembly includes an inner carrier disk having a hub receiving opening through the center thereof within which to receive said first hub and an outer drive ring having a disk receiving opening through the center thereof within which to receive said inner carrier disk, said outer drive ring surrounding said inner carrier disk and having a series of drive teeth around the periphery thereof at which to receive said driving force to be imparted to the wheel by way of said first hub, the inner carrier disk and the outer drive ring of said lug drive sprocket being detachably connected to one another, and
wherein the first hub of said lug drive hub assembly includes a clamp at the first end thereof to be connected to the first side of the wheel and a flange at the opposite end to be detachably connected to said lug drive sprocket without the use of bolts, the flange of said first hub being received within the hub receiving opening through the center of the inner carrier disk of said lug drive sprocket.

2. The combination recited in claim 1, wherein the first hub of said lug drive hub assembly has a wheel axle receiving passage running therethrough and being axially aligned with the hub receiving opening through the center of the inner carrier disk of said lug drive sprocket when the flange of said first hub is detachably connected to said lug drive sprocket.

3. The combination recited in claim 1, the flange of the first hub of said lug drive hub assembly has a plurality of lugs extending therefrom and the inner carrier disk of said lug drive sprocket has a plurality of lug cavities formed therein and extending around the hub receiving opening through the center of said inner carrier disk, said plurality of lugs that extend from said flange being received by respective ones of said plurality of lug cavities of said inner carrier disk and moving through the hub receiving opening at the center of said inner carrier disk, whereby said first hub is attached to said lug drive sprocket.

4. The combination recited in claim 3, wherein each of said plurality of lugs which extends from the flange of said first hub and moves through the hub receiving opening at the center of the inner carrier disk of said lug drive sprocket has a ring engaging tip, said lug drive hub assembly also including an inner retaining ring located below and in engagement with the ring retaining tips of said plurality of lugs so as to lie against said inner carrier disk by which the first hub and the lug drive sprocket of said lug drive hub assembly are detachably connected to one another without the use of bolts.

5. The combination recited in claim 4, wherein said inner retaining ring is flexible and adapted to be deformed so as to be moved out of said engagement with the ring retaining tips of said plurality of lugs, whereby said first hub is detached from said lug drive sprocket.

6. The combination recited in claim 1, wherein the inner carrier disk of said lug drive sprocket has a plurality of lugs extending therefrom and the outer drive ring of said lug drive sprocket has a plurality of lug cavities formed therein and extending around the disk receiving opening through the center of said outer drive ring, said plurality of lugs which extend from said inner carrier disk being received by respective ones of said plurality of lug cavities of said outer drive ring and moving through the disk receiving opening at the center of outer drive ring, whereby said inner carrier disk is attached to said outer drive ring at said disk receiving opening thereof.

7. The combination recited in claim 6, wherein each of said plurality of lugs which extends from the inner carrier disk and moves through the disk receiving opening at the center of said outer drive ring has a ring engaging tip, said lug drive sprocket also including an outer retaining ring located below and in engagement with the ring retaining tips of said plurality of lugs so as to lie against said outer drive ring by which said inner carrier disk is detachably connected to said outer drive ring.

8. The combination recited in claim 7, wherein said outer retaining ring is flexible and adapted to be deformed so as to be moved out of said engagement with the ring retaining tips of said plurality of lugs, whereby said inner carrier disk is detached from said outer drive ring.

9. The combination recited in claim 1, wherein the lug drive rotor assembly of said lug drive system includes a second hub connected to the opposite side of the wheel and a lug brake rotor to receive said braking force and apply said braking force to the wheel, the second hub and the lug brake rotor of said lug drive rotor assembly being detachably connected to one another without the use of bolts.

10. The combination recited in claim 9, wherein the lug brake rotor of said lug drive rotor assembly includes an inner carrier disk having a hub receiving opening through the center thereof within which to receive said second hub and an outer friction ring surrounding said inner carrier disk and receiving the braking force to be imparted to the wheel, the inner carrier disk and the outer friction ring of said lug brake rotor being detachably connected to one another.

11. The combination recited in claim 10, wherein the outer friction ring of said lug brake rotor has a plurality of gas passages recessed therein and located so that gas generated when the braking force is imparted to the wheel is transmitted to the atmosphere by way of said gas passages.

12. The combination recited in claim 10, wherein the second hub of said lug drive rotor assembly includes a clamp at one end thereof to be connected to the opposite side of the wheel and a flange at the opposite end to be detachably connected to said lug brake rotor without the use of bolts, the flange of said second hub being received within the hub receiving opening through the center of the inner carrier disk of said lug brake rotor.

13. The combination recited in claim 12, wherein the second hub of said lug drive rotor assembly has a wheel axle receiving passage running therethrough and being axially aligned with the hub receiving opening through the center of the inner carrier disk of said lug brake rotor when the flange of said second hub is detachably connected to said lug brake rotor.

14. The combination recited in claim 12, wherein the flange of the second hub of said lug drive rotor assembly has a plurality of lugs extending therefrom and the inner carrier disk of said lug brake rotor has a plurality of lug cavities formed therein and extending around the hub receiving opening through the center of said inner carrier disk, said plurality of lugs which extend from said flange being receiving by respective ones of said plurality of lug cavities of said inner carrier disk and moving through the hub receiving opening at the center of said inner carrier disk, whereby said second hub is attached to said lug brake rotor.

15. The combination recited in claim 14, wherein each of said plurality of lugs which extends from the flange of said second hub and moves through the hub receiving opening at the center of the inner carrier disk of said lug brake rotor has a ring engaging tip, said lug drive rotor assembly also including an outer retaining ring located below and in engagement with the ring retaining tips of said plurality of lugs so as to lie against said inner carrier disk by which the second hub and the lug brake rotor of said lug drive rotor assembly are detachably connected to one another without the use bolts.

16. The combination recited in claim 15, wherein said outer retaining ring is flexible and adapted to be deformed so as to be moved out of said engagement with the ring retaining tips of said plurality of lugs, whereby said second hub is detached from said lug brake rotor.

17. A combination comprising:
a wheel having first and opposite sides; and
a lug drive system to be coupled to the wheel to apply driving and braking forces to the wheel, said lug drive system having a lug drive rotor assembly located at the first side of the wheel and a lug drive hub assembly located at the opposite side of the wheel,
the lug drive rotor assembly of said lug drive system including a first hub connected to the first side of the wheel and a lug brake rotor to receive said braking force and impart said braking force to the wheel, the first hub and the lug brake rotor of said lug drive rotor assembly being detachably connected to one another without the use of bolts,
wherein the lug brake rotor of said lug drive rotor of said lug drive rotor assembly includes an inner carrier disk having a hub receiving opening through the center thereof within which to receive said first hub and an outer friction ring surrounding said inner carrier disk and receiving the braking force to be imparted to the wheel, the inner carrier disk and the outer friction ring of said lug brake rotor being detachably connected to one another, and
the first hub of said lug drive rotor assembly includes a clamp at one end thereof to be connected to the first side of the wheel and a flange at the opposite end to be detachably connected to said lug brake rotor without the use of bolts, the flange of said first hub being received within the hub receiving opening through the center of the inner carrier disk of said lug brake rotor.

18. The combination recited in claim 17, wherein the outer friction ring of said lug brake rotor has a plurality of gas passages recessed therein and located so that gas generated when the braking force is imparted to the wheel is transmitted to the atmosphere by way of said gas passages.

19. The combination recited in claim 17, wherein the flange of the first hub of said lug drive rotor assembly has a plurality of lugs extending therefrom and the inner carrier disk of said lug brake rotor has a plurality of lug cavities formed therein and extending around the hub receiving opening through the center of said inner carrier disk, said plurality of lugs which extend from said flange being receiving by respective ones of said plurality of lug cavities of said inner carrier disk and moving through the hub receiving opening at the center of said inner carrier disk, whereby said first hub is attached to said lug brake rotor.

20. The combination recited in claim 19, wherein each of said plurality of lugs which extends from the flange of said first hub and moves through the hub receiving opening at the center of the inner carrier disk of said lug brake rotor has a ring engaging tip, said lug drive rotor assembly also including an outer retaining ring located below and in engagement with the ring retaining tips of said plurality of lugs so as to lie against inner carrier disk by which the first hub and the lug brake rotor of said lug drive rotor assembly are detachably connected to one another without the use bolts.

21. The combination recited in claim 20, wherein said outer retaining ring is flexible and adapted to be deformed so as to be moved out of said engagement with the ring retaining tips of said plurality of lugs, whereby said first hub is detached from said lug brake rotor.

22. The combination recited in claim 17, wherein the lug drive hub assembly of said lug drive system includes a second hub connected to the opposite side of the wheel and a lug drive sprocket to receive said driving force and impart said driving force to the wheel by way of said second hub, the second hub and the lug drive sprocket of said lug drive hub assembly being detachably connected to one another without the use of bolts.

23. The combination recited in claim 22, wherein the lug drive sprocket of said lug drive huh assembly includes an inner carrier disk having a hub receiving opening through the center thereof within which to receive said second hub and an outer drive ring having a disk receiving opening through the center thereof within which to receive said inner carrier disk, said outer drive ring surrounding said inner carrier disk and having a series of drive teeth around the periphery thereof at which to receive said driving force to be imparted to the wheel by way of said second hub, the inner carrier disk and the outer drive ring of said lug drive sprocket being detachable connected to one another.

24. A combination comprising:
a wheel having first and opposite sides; and
a lug drive system to be connected to the wheel to apply driving and braking forces to the wheel, said lug drive system having a lug drive hub assembly located at the first side of the wheel and a lug drive rotor assembly located at the opposite side of the wheel,
the lug drive hub assembly of said lug drive system including a hub connected to the first side of the wheel and a lug drive sprocket to receive said driving force and impart said driving force to the wheel by way of said hub, the hub and the lug drive sprocket of said lug drive hub assembly being detachably connected to one another without the use of bolts,
wherein the lug drive sprocket of said lug drive hub assembly includes an inner carrier disk having a hub receiving opening through the center thereof within which to receive said hub and an outer drive ring having a disk receiving opening through the center thereof within which to receive said inner carrier disk, said outer drive ring surrounding said inner carrier disk and having a series of drive teeth around the periphery thereof at which to receive said driving force to be imparted to the wheel by way of said hub, the inner carrier disk and the outer drive ring of said lug drive sprocket being detachably connected to one another, and
wherein the inner carrier disk of said lug drive sprocket has a plurality of lugs extending therefrom and the outer drive ring of said lug drive sprocket has a plurality of lug cavities formed therein and extending around the disk receiving opening through the center of said outer drive ring, said plurality of lugs which extend from said inner carrier disk being received by respective ones of said plurality of lug cavities of said outer drive ring and moving through the disk receiving opening at the center of outer drive ring, whereby said inner carrier disk is attached to said outer drive ring at said disk receiving opening thereof, each of said plurality of lugs having a ring engaging tip, said lug drive sprocket also including an outer retaining ring located below and in engagement with the ring retaining tips of said plurality of lugs so as to lie against said outer drive ring by which said inner carrier disk is detachably connected to said outer drive ring.

25. The combination recited in claim 24, wherein said outer retaining ring is flexible and adapted to be deformed so as to be moved out of said engagement with the ring retaining tips of said plurality of lugs, whereby said inner carrier disk is detached from said outer drive ring.

26. A combination comprising:
a wheel having first and opposite sides; and
a lug drive system to be connected to the wheel to apply driving and braking forces to the wheel, said lug drive system having a lug drive hub assembly located at the first side of the wheel and a lug drive rotor assembly located at the opposite side of the wheel,
the lug drive hub assembly of said lug drive system including a hub connected to the first side of the wheel and a lug drive sprocket to receive said driving force and impart said driving force to the wheel by way of said hub, the hub and the lug drive sprocket of said lug drive hub assembly being detach ably connected to one another without the use of bolts,
wherein the lug drive sprocket of said lug drive hub assembly includes an inner carrier disk having a hub receiving opening through the center thereof within which to receive said hub and an outer drive ring having a disk receiving opening through the center thereof within which to receive said inner carrier disk, said outer drive ring surrounding said inner carrier, disk and having a series of drive teeth around the periphery thereof at which to receive said driving force to be imparted to the wheel by way of said hub, the inner carrier disk and the outer drive ring of said lug drive sprocket being detachably connected to one another,
wherein the hub of said lug drive hub assembly includes a first end to be connected to the first side of the wheel and an opposite end to be detachably connected to said lug drive sprocket without the use of bolts, the opposite end of said hub being received within the hub receiving opening through the center of the inner carrier disk of said lug drive sprocket, said opposite end having a first plurality of lugs facing outwardly therefrom and away from the first side of said wheel, and the inner carrier disk of said lug drive sprocket having a first plurality of lug cavities formed therein and extending around the hub receiving opening through the center of said inner carrier disk, said first plurality of lugs that face outwardly from the opposite end of said hub being received by respective ones of said first plurality of lug cavities of said inner carrier disk and moving through the hub receiving opening at the center of said inner carrier disk, and said lug drive sprocket also including a first flexible retaining ring located in engagement with said first plurality of outwardly facing lugs to lie against said inner carrier disk by which said hub is detachably connected to said lug drive sprocket.

27. The combination recited in claim 26, wherein the inner carrier disk of said lug drive sprocket has a second plurality of lugs facing outwardly therefrom and away from the first side of said wheel, the outer drive ring of said lug drive sprocket having a second plurality of lug cavities formed therein and extending around the disk receiving opening through the center of said outer drive ring, said second plurality of lugs which face outwardly from said inner carrier disk being received by respective ones of said second plurality of lug cavities of said outer drive ring and moving through the disk receiving opening at the center of outer drive ring, said lug drive sprocket also including a second flexible retaining ring located below in engagement with said second plurality of outwardly extending lugs so as to lie against said outer drive ring by which said inner carrier disk is detachably connected to said outer drive ring.

* * * * *